United States Patent
Chowdhury et al.

(10) Patent No.: US 7,099,073 B2
(45) Date of Patent: Aug. 29, 2006

(54) OPTICAL FREQUENCY-CONVERTERS BASED ON GROUP III-NITRIDES

(75) Inventors: Aref Chowdhury, Springfield, NJ (US); Hock Min Ng, Westfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 725 days.

(21) Appl. No.: 10/259,051

(22) Filed: Sep. 27, 2002

(65) Prior Publication Data

US 2004/0061074 A1 Apr. 1, 2004

(51) Int. Cl.
*G02F 1/365* (2006.01)
*G02F 1/377* (2006.01)

(52) U.S. Cl. .................. 359/332; 359/328; 385/122

(58) Field of Classification Search ............... 359/326, 359/328, 332; 385/122, 142
See application file for complete search history.

(56) References Cited

U.S. PATENT DOCUMENTS

| | | | |
|---|---|---|---|
| 5,341,390 A | 8/1994 | Yamada et al. ............... 372/45 |
| 5,345,456 A | 9/1994 | Dai et al. ...................... 372/22 |
| 5,396,361 A | 3/1995 | Sasaki et al. ................ 359/124 |
| 5,420,876 A | 5/1995 | Lussier et al. ................ 372/22 |
| 5,440,574 A | 8/1995 | Sobottke et al. .............. 372/34 |
| 5,450,429 A | 9/1995 | Klemer et al. ................ 372/22 |
| 5,479,431 A | 12/1995 | Sobottke et al. .............. 372/92 |
| 5,519,802 A * | 5/1996 | Field et al. .................. 385/129 |
| 5,615,041 A * | 3/1997 | Field et al. .................. 359/326 |
| 5,793,791 A | 8/1998 | Lasser et al. ................. 372/69 |
| 5,796,902 A * | 8/1998 | Bhat et al. ................... 385/122 |
| 5,814,156 A | 9/1998 | Elliott et al. .................... 134/1 |
| 6,172,325 B1 | 1/2001 | Baird et al. ............. 219/121.62 |
| 6,867,903 B1 * | 3/2005 | Imajuku et al. ............. 359/330 |

FOREIGN PATENT DOCUMENTS

JP 8-51248 2/1996 ......... 3/18

OTHER PUBLICATIONS

Eyres, L.A. et al., *All-epitaxial fabrication of thick, orientation-patterned GaAs films for nonlinear optical frequency conversion*, Applied Physics Letters, vol. 79, No. 7, Aug. 13, 2001, pp. 904-906.
Fejer, M.M. et al, *Quasi-Phase-Matched Second Harmonic Generation: Tuning and Tolerances*, IEEE Journal of Quantum Electronics, vol. 28, No. 11, Nov. 1992, pp. 2631-2654.
Stutzman, M. et al., *Playing with Polarity*, Physica Status Solidi B-Basic Research, vol. 228, No. 2, Nov. 2001, pp. 505-512.

* cited by examiner

*Primary Examiner*—John D. Lee
(74) *Attorney, Agent, or Firm*—John F. McCabe

(57) ABSTRACT

An apparatus includes an optical waveguide and an optical filter positioned to receive light from the optical waveguide. The optical waveguide includes a sequence of alternating first and second stripes. The sequence runs along a propagation direction in the optical waveguide. The first and second stripes are formed of different polarization states of a group III-nitride semiconductor. The optical filter removes light of a preselected frequency.

19 Claims, 6 Drawing Sheets

OPTICAL FREQUENCY-CONVERTERS BASED ON GROUP III-NITRIDES

BACKGROUND

1. Field of the Invention

The invention relates generally to non-linear optical devices, and more particularly, to optical frequency-converters.

2. Discussion of the Related Art

Herein, optical frequency-conversion refers to a process that directly converts light of one frequency into light of another frequency without intermediate conversion of the light into electrical signals. Materials with large cross sections for certain nonlinear optical processes are able to produce optical frequency-conversion. Lithium niobate has large cross sections for such processes and thus, has been used to construct optical frequency-converters.

Unfortunately, lithium niobate also has properties that are not desirable in optical frequency-converters. In particular, standard lithium niobate has iron as an impurity. Due to the iron impurities, the intense illumination needed for frequency-conversion causes a photorefractive effect that can spatially modulate the refractive index of lithium niobate. The refractive index of lithium niobate will be spatially modulated during optical frequency-conversion unless special precautions are taken. Such uncontrolled spatial refractive index modulations would interfere with the quasi-phase matching required for optical frequency-conversion. To avoid the iron-induced refractive index modulations, special precautions are taken to maintain lithium niobate at a high temperature during optical frequency-conversion.

It is desirable to have optical frequency-converters that efficiently generate light without the need for special precautions during operation.

SUMMARY

Various embodiments provide optical devices in which group III-nitride semiconductors (III-Nitrides) provide the nonlinear optical media for optical frequency-conversion. The III-Nitrides do not suffer from the iron-induced refractive index modulation of lithium niobate. For that reason, unlike lithium niobate, the optical frequency-converters based on III-Nitrides do not have to be maintained at a high temperature during optical frequency-conversion.

The III-Nitrides have weaker optical nonlinearities than other semiconductors that have been used in optical frequency-converters, e.g., gallium arsenide (GaAs). Even though the weaker optical nonlinearities make optical frequency-conversion less efficient, the III-Nitrides have other desirable properties. In particular, HI-Nitrides have larger bandgaps than GaAs. The larger bandgaps make the III-Nitrides transparent in the visible and/or ultraviolet spectral ranges. For that reason, optical frequency-converters based on III-Nitrides can produce light in a spectral range where GaAs optical frequency-converters do not function.

In a first aspect, the invention features an apparatus. The apparatus includes an optical waveguide and an optical filter positioned to receive light from the optical waveguide. The optical waveguide includes a sequence of alternating first and second stripes. The sequence runs along a propagation direction in the optical waveguide. The first and second stripes are formed of different polarization states of a group III-nitride semiconductor. The optical filter removes light of a preselected frequency.

In a second aspect, the invention features a light source that includes a laser and an optical waveguide. The laser is configured to emit a light beam having a preselected frequency. The optical waveguide is coupled to receive the light beam. The optical waveguide includes a group III-nitride semiconductor with an intrinsic polarization that is periodically modulated along a propagation direction in the optical waveguide.

BRIEF DESCRIPTION OF THE DRAWINGS

In Figures and text like reference numbers refer to similar elements.

DETAILED DESCRIPTION OF ILLUSTRATIVE EMBODIMENTS

Gallium arsenide (GaAs) has a large cross section for the nonlinear optical processes that cause optical frequency-conversion. GaAs frequency-converters have provided sources of second harmonic light for the infrared portion of the spectrum. Unfortunately, GaAs frequency-converters do not generate strong visible or ultraviolet sources, because GaAs strongly absorbs in both portions of the spectrum.

To obtain new strong visible and ultraviolet light sources, the inventors decided to look for other nonlinear materials. A desirable property for such nonlinear optical materials is the presence of a large second-order nonlinear susceptibility, because the rate of optical frequency-conversion grows as the square of the second-order nonlinear susceptibility. A larger second-order nonlinear susceptibility also reduces the amount of nonlinear optical material needed for optical frequency converter thereby simplifying construction.

Among nonlinear optical materials, III-Nitrides have relatively weaker second-order nonlinear susceptibilities. For example, the second-order nonlinear susceptibility of GaN has a $d_{33}$ component of only 15–16 pm/volt whereas the secondorder nonlinear susceptibility of GaAs has a $d_{14}$ component of about 90 pm/volt, i.e., about 6 times larger. Since optical frequency-conversion rates are proportional to the value of the second-order nonlinear susceptibility, GaN offers lower rates of optical frequency-conversion than GaAs. The larger second-order nonlinear susceptibility is a reason for preferring GaAs for use in optical frequency-conversion.

While the smaller second-order nonlinear susceptibility of GaN is discouraging, the inventors discovered that III-Nitrides can provide other important advantages. First, III-Nitrides like GaN do not suffer from a photorefractive effect. Thus, a GaN optical frequency-converter would not require heating during optical frequency-conversion. Second, group-III-nitride semiconductors have wider bandgaps than GaAs. For example, the bandgaps of the III-Nitrides: gallium nitride (GaN) and aluminum nitride (AlN) are: about 3.42 electron volts (eV) and about 6.2 eV, respectively. In contrast, the bandgap of GaAs is only 1.42 eV. The larger bandgaps imply that III-Nitrides are potentially able to provide optical frequency-conversion and thus, new optical sources in the visible and ultraviolet portions of the spectrum.

Figure 1:
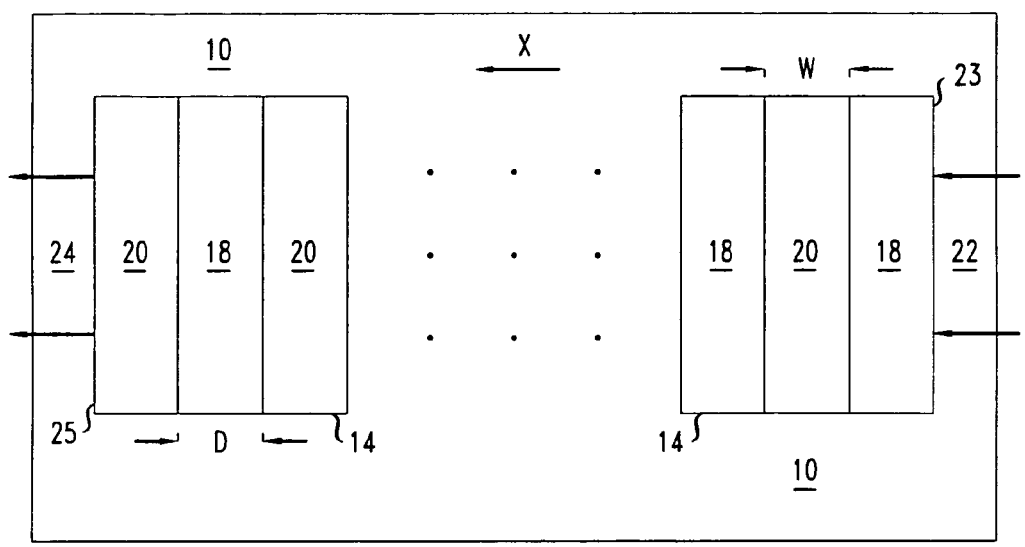
FIG. 1 is a top view of an optical frequency converter that uses the nonlinear optical properties of a group III-nitride semiconductor (III-Nitride)
Figure 2:
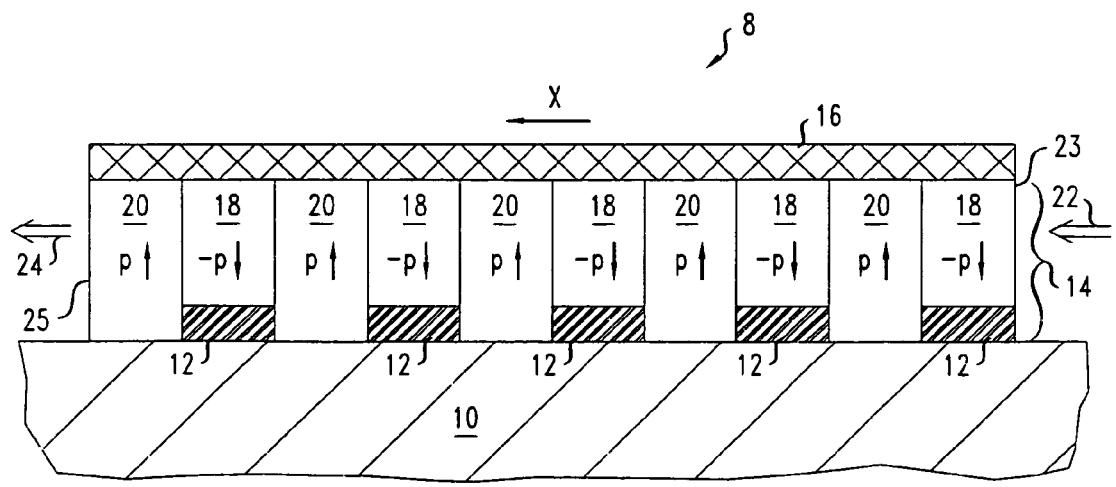
FIG. 2 is a side view of the optical frequency-converter of FIG. 1.

FIGS. 1 and 2 show a portion of an optical frequency-converter 8 based on a III-Nitride. The optical frequency-converter 8 includes a planar crystalline growth substrate 10, a striped growth initiation layer 12, and an optical waveguide with an optical core layer 14, and an optical cladding layer 16. The optical waveguide has either a planar or a ridged structure. The optical core layer 14 includes a sequence of alternating stripes 18 and 20 of respective widths D and W. The stripes 18 and 20 are formed of crystalline III-Nitride with opposite intrinsic polarizations. The stripes 18 and 20 produce a polarization modulation along a propagation direction "X" in the planar optical core 14. The polarization modulation period is P, which is equal to W+D. During fabrication, the crystalline growth substrate 10 and striped growth initiation layer 12 cause the growing stripes of III-Nitride to have opposite intrinsic polarizations.

In operation, the optical core and cladding layers 14, 16, receive an incoming optical signal 22 with a predetermined frequency at end face 23 and generate an outgoing optical signal 24 at end face 25. The outgoing optical signal 24 includes an optical component having a converted frequency. Nonlinear optical processes in the III-Nitride of the optical core layer 14 generate the optical component with the converted frequency. In the optical core layer 14, the opposite polarizations of the stripes 18 and 20 produce quasi-phase matching conditions so that the amplitude of the converted frequency component grows linearly with propagation distance along the direction "X" (see below).

In an exemplary optical frequency-converter 8, the crystalline growth substrate 10 is, e.g., sapphire, the striped growth initiation layer 12 is epitaxially grown aluminum nitride (AlN), and the optical core layer 14 is epitaxially grown gallium nitride (GaN). The exemplary striped growth initiation layer 12 is formed from a sequence of parallel AlN stripes whose widths and inter-stripe separations are about equal to D and W, respectively. The optical core layer 14 includes an alternating sequence of crystalline G-polar GaN stripes 18 and crystalline N-polar GaN stripes 20. The G-polar and N-polar GaN stripes 18, 20 have relatively inverted intrinsic polarizations. The G-polar GaN stripes 18 have widths of D, and the N-polar GaN stripes 20 have widths of W. Preferably the widths of the G-polar and N-polar stripes 18, 20 are equal, i.e., W=D, which corresponds to a 50% duty cycle. Other embodiments cover other values of the duty cycle. The G-polar and N-polar GaN stripes 18, 20 rest on the AlN stripes 12 and the sapphire substrate 10, respectively. The individual GaN stripes 18, 20 extend perpendicular to the propagation direction "X" in the planar optical core layer 14. The G-polar and N-polar GaN stripes 18, 20 have heights of the order of the wavelength of incoming light beam 22. Exemplary heights are in a range of about 0.5 microns to about 10 microns.

The polarization inversions between the III-Nitride stripes 18 and 20 of optical core layer 14 affect the production of frequency-converted light. The polarization inversions produce relative phase shifts of π between frequency-converted light generated in the stripes 18 and the stripes 20. These relative phase shifts enable quasi-phase matching of light from different portions of the optical core layer 14 as described below.

Figure 3:
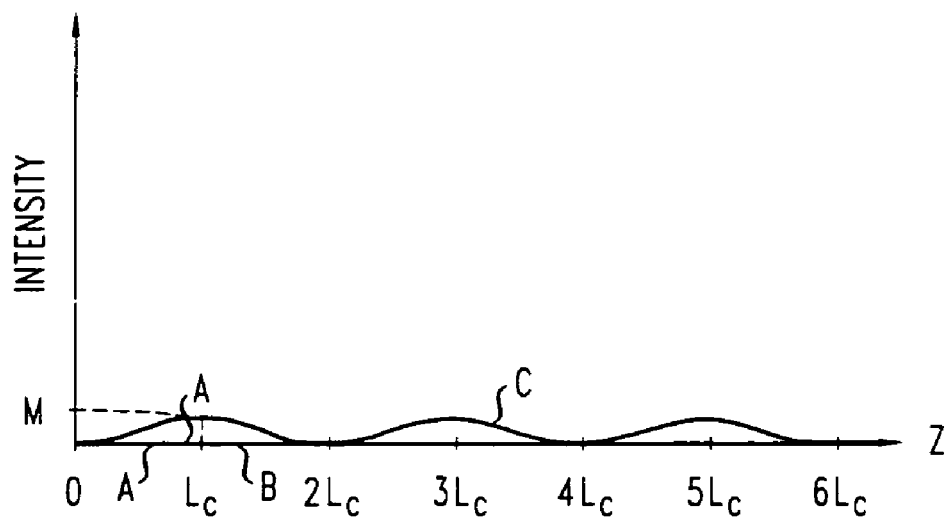
FIG. 3 illustrates how the intensity of generated second harmonic light varies with distance in a homogeneous nonlinear optical waveguide.

FIG. 3 illustrates how the intensity of second harmonic light varies with propagation distance, z, in a homogeneous nonlinear optical waveguide. The nonlinear optical waveguide generates coherent second harmonic light if the incoming light is coherent. For that reason, the second harmonic light generated at point z=A will propagate through the nonlinear optical medium and interfere with the second harmonic light generated later at another point z=B. Due to dispersion in the medium, the phases of second harmonic light from different portions of the nonlinear optical waveguide will not automatically be equal. In fact, the interference of such light produces a periodically varying intensity along the propagation direction "z". Thus, destructive interference due to dispersion keeps the maximum intensity, M, of second harmonic light and of other types of frequency-converted light low, i.e., too low for the efficient generation of frequency-converted light.

In a homogeneous nonlinear optical medium, the period of the variation in the intensity of frequency-converted light is $2L_c$. $L_c$ is known as the coherence length. $L_c$ is the distance between adjacent minima and maxima on the intensity curve for such light. The value of $L_c$ depends on the one or more frequencies of incoming light, the dispersion of the medium, and the process for producing the frequency-converted light.

Figure 4:
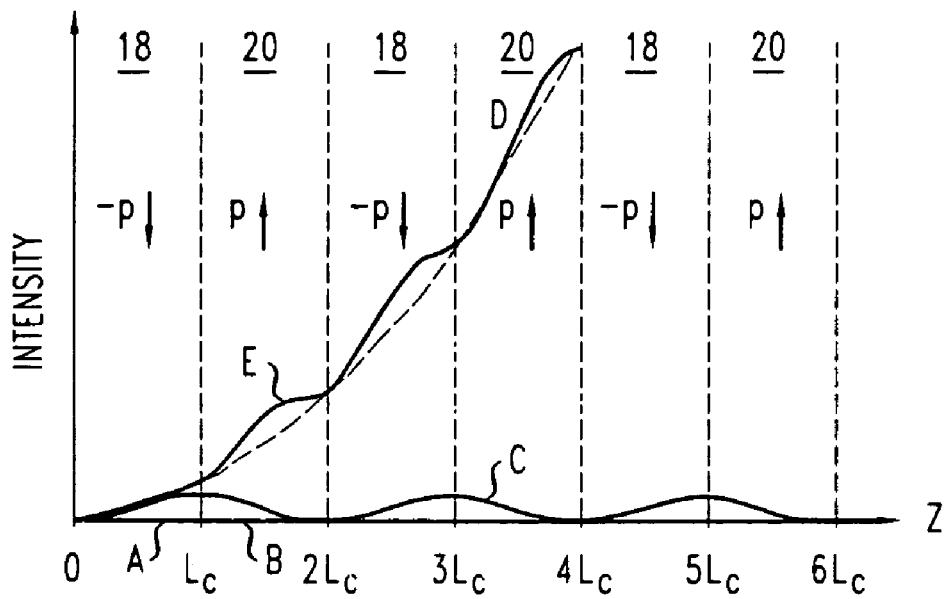
FIG. 4 illustrates how the intensity of frequency-converted light varies with distance in an embodiment of the optical waveguide of FIGS. 1 and 2 in which the intrinsic polarization's modulation period is $2L_c$.

FIG. 4 illustrates how polarization modulation changes the intensity of frequency-converted light in one embodiment of the optical waveguide core layer 14 of FIGS. 1 and 2. Here, the III-Nitride stripes 18 and 20 periodically flip the intrinsic nonlinear polarization between the values −P and +P. This implies that the second-order nonlinear susceptibility has reversed signs in the stripes 18 and the stripes 20. The polarization inversions between adjacent III-Nitride stripes 18, 20 introduce a relative phase shift of π between frequency-converted light generated in adjacent polarized III-Nitride stripes 18 and 20. This additional relative phase shift compensates for the dispersion-induced phase difference between light generated in the polarized III-Nitride stripes 18 and 20. Due to the compensation, frequency-converted light from adjacent polarized III-Nitride stripes 18 and 20 interferes constructively rather than destructively. Thus, the amplitude for frequency-converted light grows approximately linearly along the propagation direction, i.e., approximately linearly with the number of stripes. The intensity of such light grows approximately quadratically in "z" as shown in curve E.

Figure 5:
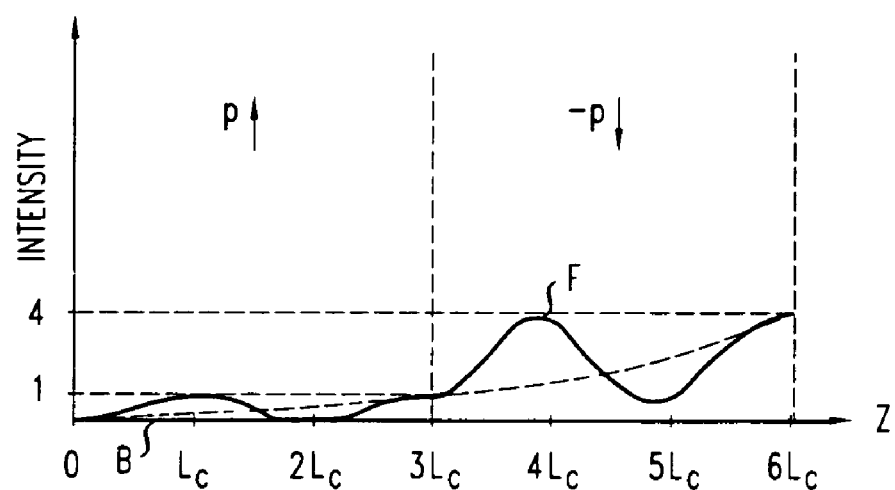
FIG. 5, illustrates how the intensity of frequency-converted light varies with distance in an embodiment of the optical waveguide of FIGS. 1 and 2 in which the intrinsic polarization's modulation period is $6L_c$.

For optimal generation of frequency-converted light, i.e., intensity growing quadratically with the number of polarized stripes, the polarization modulation period must be equal to an integer "q" times $L_c$ where q=2+4r for "r" a non-negative integer. In FIG. 4, the medium has a polarization modulation period of $2L_c$, and the intensity of frequency-converted light grows quadratically with the number of stripes. In FIG. 5, the medium is formed of an alternating sequence of stripes of width $3L_c$. In this case, the polarization modulation period is $6L_c$. As curve F of FIG. 5 shows, the $6L_c$ polarization modulation period also produces an intensity that grows quadratically with the number of polarized stripes. The value of the intensity is however, smaller when the polarization modulation period is $6L_c$ than when the polarization modulation period is $2L_c$.

When the polarization modulation period is not exactly $(2+4r)L_c$ with r a nonnegative integer, the modulation does not completely compensate dispersion-induced relative phases. Instead, a residual relative phase grows with the number of modulation periods thereby producing destructive interference between frequency-converted light generated in widely separated polarized stripes. This destructive interference will wash out the frequency-converted light if a optical frequency-converter with such an error in modulation period has too long a sequence of polarized stripes. To avoid washout, high precision fabrication is required in frequency-converters with many stripes. Thus, making a III-nitride frequency-converter is more difficult than making a GaAs frequency-converter, because the III-nitride frequency converter needs more stripes to generate the same amount of frequency-converted light.

Figure 6:
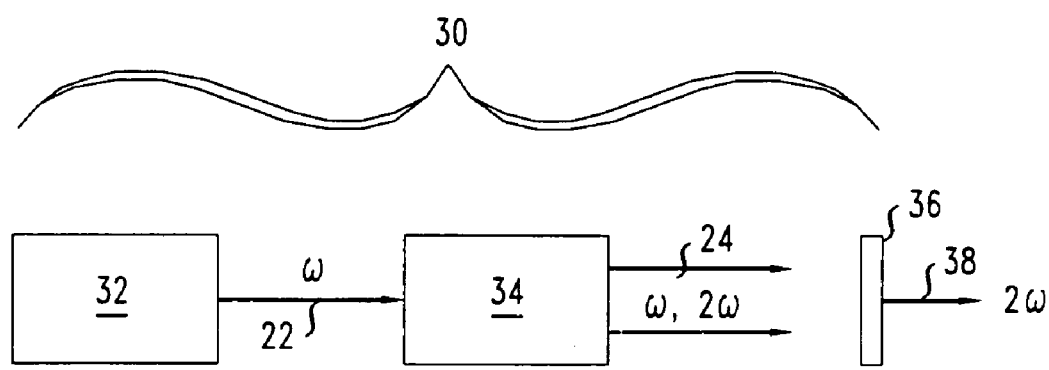
FIG. 6 is a block diagram for a nonlinear optical source that generates harmonic light.
Figure 7:
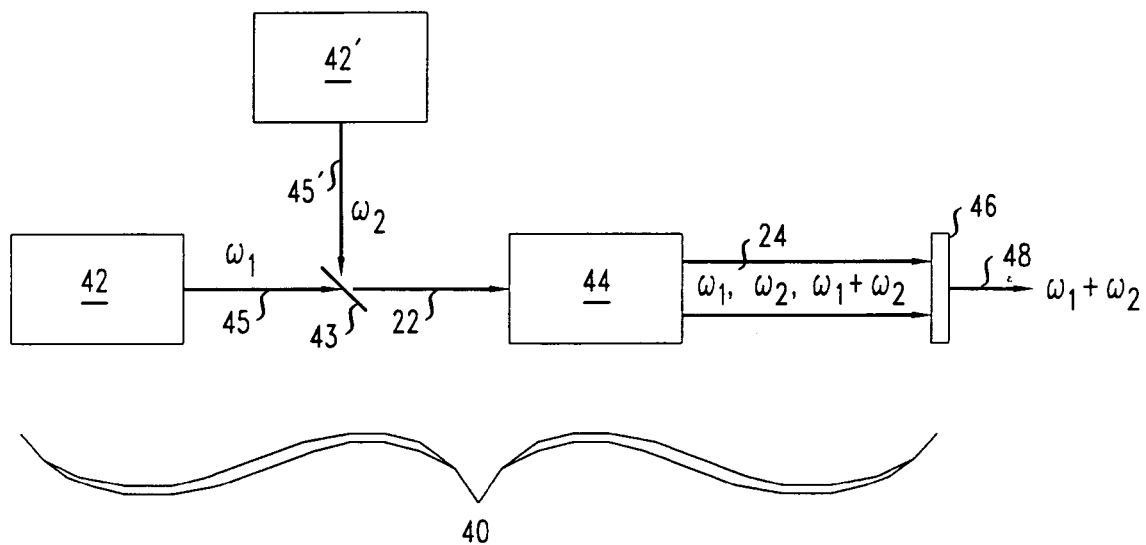
FIG. 7 is a block diagram for a nonlinear optical source that generates parametric light.
Figure 8:
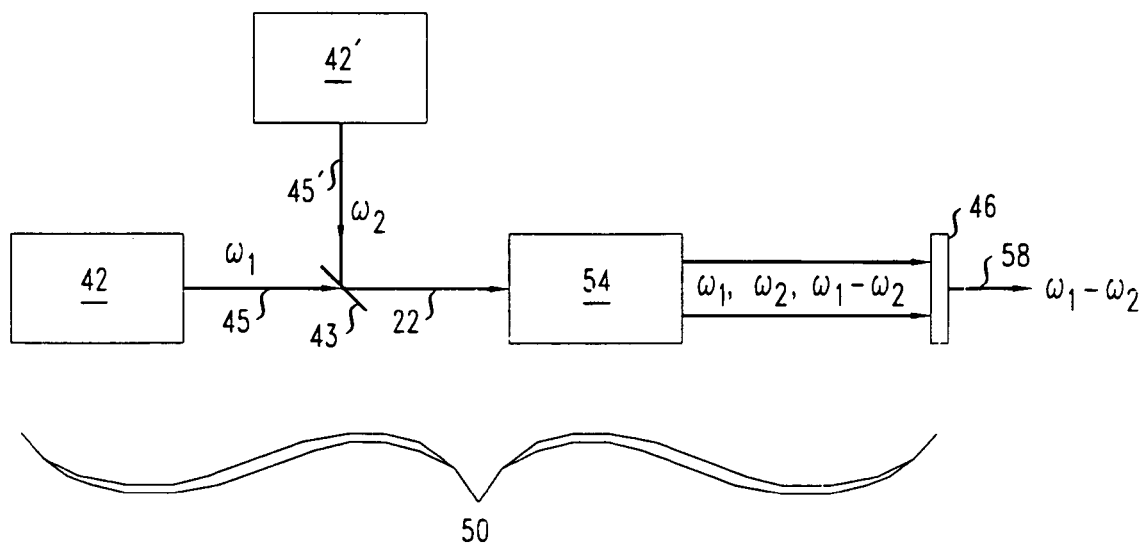
FIG. 8 is a block diagram for another nonlinear optical source that generates parametric light.

FIGS. 6–8 show nonlinear optical sources 30, 40, 50 that exploit III-Nitrides to produce second harmonic and parametric light.

FIG. 6 shows a nonlinear optical source 30 for generating second harmonic light. The source 30 includes a laser 32, a second harmonic generator 34, and an optical filter 36. The laser 32 produces incoming beam 22 in which light has a preselected frequency w. The second harmonic generator 34 is a specific embodiment of the optical frequency-converter 8 of FIGS. 1 and 2 in which widths D and W of the polarized III-Nitride stripes 18 and 20 are adapted to generate light at the second harmonic frequency 2w. Preferred values for W and D are. $W=D=L_{c,h}$ where $L_{c,h}$ is the coherence length for generating second harmonic light. The optical filter 36 removes light of frequency w to produce an output light beam 38 having only the second harmonic frequency 2w.

For second harmonic generator, the coherence length is defined by: $L_{c,h}=\pi C/[2w[n(2w)-n(w)]$. Here, C is the speed of light in free space, and n(w) and n(2w) are the refractive indexes of the polarized III-Nitride stripes 18, 20, shown in FIGS. 1–2, at the incoming frequency w and second harmonic frequency 2w, respectively.

FIG. 7 shows a nonlinear optical source 40 for generating parametric light at a summed frequency. The source 40 includes first and second lasers 42, 42', an optical beam combiner 43, a parametric light generator 44, and an optical filter 46. The first and second lasers 42, 42' produce incoming light beams 45, 45' of respective preselected frequencies $w_1$ and $w_2$. The parametric light generator 44 is a specific embodiment of the optical frequency-converter 8 of FIGS. 1 and 2 in which the widths W and D of the III-Nitride stripes 18, 20 are adapted to coherently produce parametric light at the summed frequency $w_1+w_2$. Exemplary values for the widths are: $W=D=L_{c,p+}$ where $L_{c,p+}$ is the coherence length for generating parametric light at a summed frequency. The optical filter 46 filters out light at the incoming frequencies $w_1$ and $w_2$ so that output light beam 48 has substantially only parametric light at the frequency $w_1+w_2$.

The coherence length for generating parametric light at a summed frequency is defined by, $L_{c,p+}=\pi C/[[w_1+w_2]n(w_1+w_2)-w_1n(w_1)-w_2n(w_2))]$. Here, $n(w_1)$, $n(w_2)$, and $n(w_1+w_2)$ are the refractive indexes of the polarized III-Nitride stripes 18, 20 at the frequencies of the light beam 45, the light beam 45', and of the summed frequency of the parametric light.

FIG. 8 shows a nonlinear optical source 50 for generating parametric light at a difference frequency. The source 50 includes the first and second lasers 42, 42', an optical beam combiner 43, a parametric light generator 54, and an optical filter 46. The lasers 42, 42', optical beam combiner 43', optical filter 46 were already described with respect to the nonlinear optical source 40 of FIG. 8. The parametric light generator 54 is a specific embodiment of the optical frequency-converter 8 of FIGS. 1 and 2 in which the widths W and D of the III-Nitride stripes 18, 20 are adapted to produce parametric light at the difference frequency $w_1-w_2$. Exemplary values for the widths are: $W=D=L_{c,p-}$ where $L_{c,p-}$ is the coherence length for generating parametric light at a difference frequency. The coherent source 50 produces an output beam 58 of parametric light having substantially only the frequency $w_1-w_2$.

The coherence length for generating parametric light at a difference frequency is defined by, $L_{c,p-}=\pi C/[(|w_1-w_2|n(w_1-w_2)-|w_1n(w_1)-w_2n(w_2)|)]$. Here, $n(w_1)$, $n(w_2)$, and $n(w_1+w_2)$ are the refractive indexes of the polarized III-Nitride stripes 18, 20 at the frequencies of the first incoming light beam 45, the second incoming light beam 45', and the difference frequency of the parametric light.

For bulk samples, coherence lengths for generating second harmonic light, parametric light at a summed frequency, and parametric light at a difference frequency are written as: $L_{c,h}^{bulk}$, $L_{c,p+}^{bulk}$, and $L_{c,p-}^{bulk}$, respectively. $L_{c,h}^{bulk}$, $L_{c,p+}^{bulk}$, and $L_{c,p-}^{bulk}$ can be evaluated from the above equations for $L_{c,h}$, $L_{c,p+}$, and $L_{c,p-}$ if the stripe refractive indexes are replaced by the corresponding refractive indexes for bulk III-Nitride samples.

In the frequency-converter 8 of FIGS. 1 and 2, the stripes 18, 20 are III-nitrides films whose thicknesses normal to substrate 10 preferably produce single mode operation and enable efficient end coupling to the core layer 14. Exemplary preferred thicknesses are between about 0.5 and 10 microns ($\mu$m) for wavelengths in the 0.5 $\mu$m to 1.5 $\mu$m range. Such thin III-nitride films have refractive indexes with non-bulk values if the films are grown on non-lattice-matched substrates such as sapphire. Refractive indexes have bulk values in much thicker films, e.g., 200–300 $\mu$m or thicker films for GaN. The inventors have shown that n(w) is not equal to $n^{bulk}(w)$ for the GaN stripes 18, 20 with heights of about 2 $\mu$m by spectroscopic ellipsometry measurements. The difference between the bulk and stripe refractive indexes imply that: $L_{c,h} \neq L_{c,h}^{bulk}$, $L_{c,p+} \neq L_{c,p+}^{bulk}$, and $L_{c,p-} \neq L_{c,p-}^{bulk}$ in embodiments of the frequency-converter 8 that use thin films of GaN in the stripes 18, 20.

As already discussed, the polarization modulation period, P, preferably is very nearly equal to $L_c$ times a selected integer q=2+4r. In GaN embodiments of the GaN frequency-converter 8, the difference between stripe and bulk coherence lengths further implies that: $|P-qL_{c,h}|<|P-qL_{c,h}^{bulk}|$, $|P-qL_{c,p+}|<|P-qL_{c,p+}^{bulk}|$, and $|P-qL_{c,p-}|<|P-qL_{c,p-}^{bulk}|$. For a thin core layer 14, e.g., thinner than 10 $\mu$m, the frequency doubled by the frequency-converter 8 is expected to differ by several percent from the frequency doubled as predicted from the values of bulk refractive indexes, the measured coherence length, and the above equations for $L_{c,h}^{bulk}$. For thin III-Nitride layers, the $L_c$'s and corresponding $L_c^{bulk}$'s have such different values that P more preferably satisfies $|P-qL_c|<0.5.|P-qL_c^{bulk}|$ for the corresponding $L_c$ and $L_c^{bulk}$.

The inequality of stripe and bulk refractive indexes is believed to result from lattice-strain in the thin III-nitride layers that are grown on a lattice mismatched growth substrate. The relatively high lattice-strain probably, in part, results from the relative thinness of the optical core layer 14 as compared to the nonlinear optical layer used in prior art optical frequency-generators.

Figure 9:
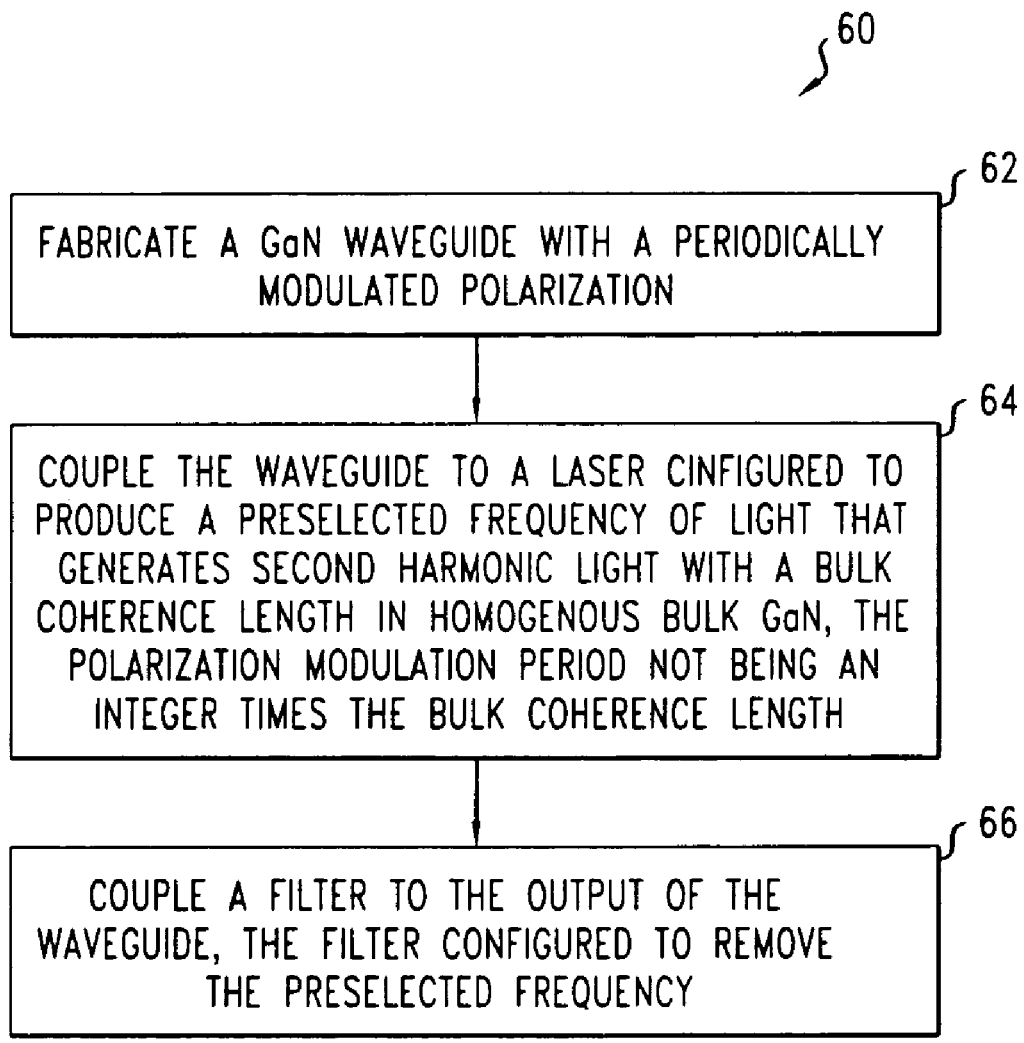
FIG. 9 is a flow chart for a method of making the nonlinear optical light source of FIG. 6.

FIG. 9 illustrates a method 60 for making nonlinear optical light source 30 of FIG. 6. The method 60 includes fabricating a GaN embodiment of optical second harmonic generator 34 (step 62) and then, assembling the nonlinear optical light source 30 from the second harmonic generator 34 (steps 64, 66).

The fabrication step includes preparing a sapphire growth substrate (sub-step 62a), forming a striped growth initiation layer 12 (sub-step 62b), epitaxially growing a GaN layer (sub-step 62c), and finishing the GaN layer to produce an embodiment of the second harmonic optical generator 32, which includes a polarization modulated GaN waveguide (sub-step 62d).

Preparing the growth substrate includes cleaning a smooth (0001) surface of a crystalline sapphire substrate (sub-step 62a). The cleaning includes washing the surface for 1 minute in an aqueous cleaning solution. Mixing a first aqueous solution having about 96 weight % $H_2SO_4$ with a second aqueous solution having about 30 weight % $H_2O_2$ forms the aqueous cleaning solution. During the mixing, about 10 volume parts of the first solution are combined with one volume part of the second solution. The cleaning also includes rinsing the washed surface with de-ionized water and then spin-drying the sapphire substrate.

Preparing the growth substrate also includes degassing the sapphire substrate in the buffer chamber of a molecular beam epitaxy (MBE) system at about 200° C. The degassing continues until the chamber pressure is below about $5 \times 10^{-9}$ Torr. After the degassing, the sapphire substrate is transferred to the growth chamber of the MBE system.

Forming the striped growth initiation layer 12 includes performing an MBE growth of an AlN layer on the sapphire substrate (sub-step 62b). To perform the MBE growth, the temperature of the growth chamber is raised at a rate of about 8° C. per minute to a final temperature of about 700° C.–730° C. Then, the MBE system grows the AlN layer to a thickness sufficient to cover portions of the sapphire surface, e.g., a thickness of 20 nanometers (nm) to 30 nm. In the model 32P Molecular Beam Epitaxy system made by Riber Corporation of 133 boulevard National, Boite Postale 231, 92503 Rueil Malmaison France, the growth conditions are: Al effusion cell temperature of about 1050° C., nitrogen flow rate of about 2 sccm, and RF power of about 500 watts (W).

Forming the striped growth initiation layer 12 includes performing an MBE growth of about 50 nm of GaN on the already grown AlN layer to prevent oxidation of the AlN upon subsequent removal from the MBE growth chamber. Growth conditions for the GaN layer are similar to those for the MBE growth of the AlN layer except that the temperature is raised in the Ga effusion cell rather than in the Al effusion cell. During this growth, the Ga effusion cell has a temperature of about 1000° C. to about 1020° C.

After cooling the sapphire substrate to about 200° C., the GaN and AlN layers are patterned to form a sequence of GaN topped AlN stripes 12 with period P. The patterning includes forming a photoresist mask with a sequence of stripes on the GaN layer and then, performing a conventional chlorine-based plasma etch to remove the unprotected portions of the GaN and AlN layers. Exemplary conditions for the plasma etch are: RF source power of about 300–500 watts, source bias of –100 to –200 volts, chlorine-argon flow rate of about 10–25 sccm (20% to 50% of the flow being argon), and a gas pressure of about 1 millitorr to about 10 millitorr. The plasma etch produces a sequence of parallel and equally spaced GaN topped AlN stripes. The GaN topped AlN stripes form a sequence on the surface of the sapphire substrate. The polarization modulation of the sequence of GaN topped AlN stripes 12 has the periodicity of the III-Nitride stripes 18, 20 in the specific frequency-converter 8 being constructed.

After the plasma etch, the sapphire substrate with GaN topped AlN stripes is cleaned in an aqueous solution of HCl, rinsed in de-ionized water, and spun dry. This aqueous cleaning solution includes between about 36.5 weight % HCl and about 48 weight % HCl. Then, the above-described steps are again used to reintroduce the sapphire substrate into the MBE system.

Epitaxially growing a III-Nitride layer includes performing an MBE growth of GaN to produce a layer with a thickness of between about 0.5μ to about 10μ (sub-step step 62c). During the MBE growth, the system conditions, are: Ga effusion cell temperature of about 1000° C. to about 1020° C., nitrogen flow rate of about 2 sccm, and RF power of about 500 watts (W). During this growth, the GaN topped AlN stripes initiate growth of G-polar GaN, and exposed portions of the sapphire substrate 10 initiate growth of N-polar GaN. The striped growth initiation layer 12 causes growth of an alternating sequence of G-polar and N-polar GaN stripes, i.e., of alternating intrinsic polarization.

The epitaxially grown structure is finished by conventional methods, e.g., polishing, to produce either a planar GaN optical waveguide or a ridged GaN optical waveguide. In either case, the GaN stripes 18, 20 produce an intrinsic polarization modulation of period P (sub-step 62d). This completes fabrication of the optical second-harmonic generator 34 of FIG. 6.

The assembly of the nonlinear optical light source 30 includes coupling a laser 32 to an input end face 23 of the planar GaN optical waveguide (step 68). The laser 32 is configured to produce a preselected frequency that generates second harmonic light with a bulk coherence length, $L_c^{Bulk}$, in bulk homogeneous GaN. P is preselected to not be an integer times $L_c^{Bulk}$.

The assembly of the nonlinear optical light source 30 also includes coupling an optical filter 36 to receive light from an output end face 25 of the planar GaN optical waveguide (step 70). The optical filter 36 configured to remove light of the preselected frequency produced by the laser 32.

Figure 10:
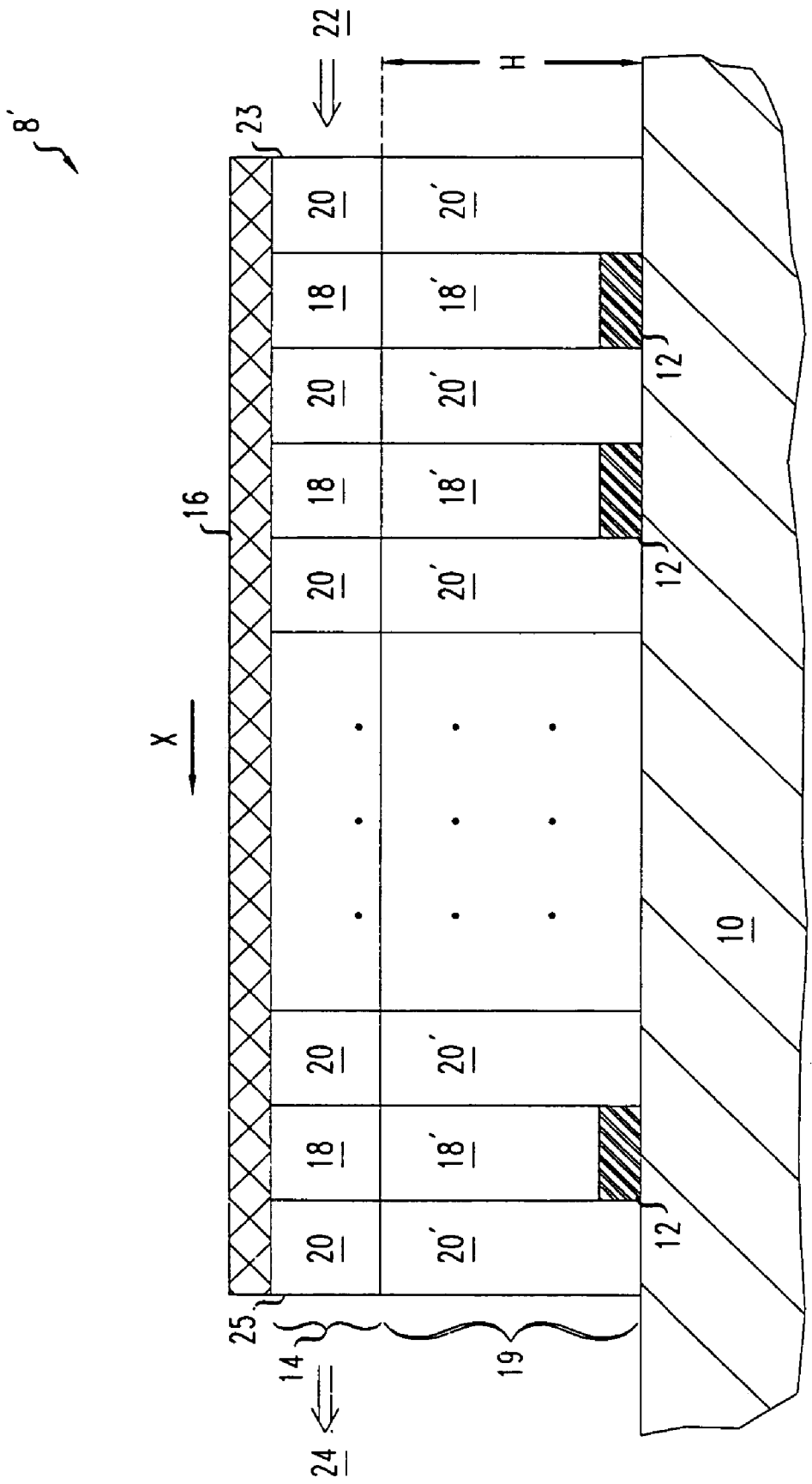
FIG. 10 is a side view of an alternate optical frequency-converter that uses the nonlinear optical properties of a non-strained layer of group III-Nitride.

FIG. 10 shows another optical frequency converter 8' based on a group III-Nitride. The optical frequency-converter 8' includes a planar crystalline growth substrate 10, a striped growth initiation layer 12, a planar or ridged optical waveguide core layer 14, an optical cladding layer 16, and a thick layer 19.

During operation, the optical core 14 receives an incoming optical signal 22 with a predetermined frequency at end face 23 and generates an outgoing optical signal 24 having a converted frequency at end face 25. The frequency conversion results from nonlinear optical processes in the III-Nitride of the optical core layer 14.

In both the optical core and thick layers 14, 19, a sequence of stripes (18, 20) and (18', 20') of crystalline III-Nitride modulate the intrinsic polarization. The stripes 18, 20 are laterally aligned over the stripes 18', 20'. The stripes 18, 20 have alternating polarizations and thus, cause quasi-phase modulation of light propagating in the optical core layer 14. The stripes 18', 20' have heights "H," that are large enough to relax lattice-strain in the III-Nitride. The lattice strain results primarily from epitaxially growing the III-Nitride stripes 18', 20' on the growth substrate 10, which has unmatching lattice constants.

The thick layer 19 serves both to relax lattice strain and to optically clad the optical core layer 14. The thick layer 19 relaxes lattice strain, because the layer 19 is much thicker than the optical core layer, e.g., 10 or more times thicker. The optical cladding function results, because the thick layer 19 has a lower refractive index than the optical core layer 14. Due to the thick layer 19, the optical core layer 14 functions as an optical waveguide whose refractive index corresponds to that of bulk samples of the III-Nitride therein.

In an exemplary optical frequency-converter 8', the growth substrate 10 is sapphire, the growth initiation layer 12 is epitaxially grown AlN, and the thick and cladding layers 19, 16 are epitaxially grown AlGaN. The optical core layer 14 is either epitaxially grown GaN or epitaxially grown AlGaN in which the percentage of aluminum is lower than that in the AlGaN of the layers 19, 16. For this reason, the optical core layer 14 has a higher refractive index than the cladding or thick layers 16, 19.

The optical core layer 14 has a height of about 0.5 to 10 times the free-space wavelength of light being frequency converted, e.g., 0.5 µm to 10 µm, so that significant amounts of the light can be end coupled into the optical core layer 14. In contrast, the thick layer 19 is, at least, 10 times higher so that lattice strain created by growth on the lattice-unmatched growth substrate 10 significantly relaxes therein. Exemplary thick layers 19 have a height "H" of 10 µm–20 µm or more and preferably have a height "H" of 50 µm or more.

In the layers 19, 14, the stripes 18 and 18' are crystalline G-polar GaN and AlGaN, respectively, and the stripes 20 and 20' are crystalline N-polar AlGaN and AlGaN, respectively. The G-polar stripes 18, 18' and the N-polar stripes 20, 20' preferably have the same width D'. D' is equal to the bulk coherence length in the core layer's III-Nitride for the optical conversion process produced therein.

In various embodiments, the optical frequency converter 8' functions as the nonlinear light generators 34, 44, and 54 shown in FIGS. 7–9. To function as nonlinear light generators 34, 44, and 54, the width D' of the stripes 18 and 20 in the optical frequency-converter 8' preferably satisfies: D= $L_{c,h}^{bulk}$, D=$L_{c,p+}^{bulk}$, and D=$L_{c,p-}^{bulk}$, respectively. Here, the coherence lengths $L_{c,h}^{bulk}$, $L_{c,p+}^{bulk}$, and $L_{c,p-}^{bulk}$ are appropriate for the frequencies of lasers 32, 42, 42', which are used in the nonlinear light sources 30, 40, and 50 of FIGS. 7–9.

From the disclosure, drawings, and claims, other embodiments of the invention will be apparent to those skilled in the art.

What is claimed is:

1. A light source, comprising:
    a laser configured to emit a light beam having a preselected frequency; and
    an optical waveguide coupled to receive the light beam and comprising a layer of a first group III-nitride semiconductor and a striped layer of a second group nitride semiconductor next to the layer of the first group III-nitride semiconductor;
    wherein an intrinsic polarization of the layer of the first group III-nitride semiconductor is periodically modulated along a propagation direction in the waveguide.

2. The light source of claim 1, wherein the layer of the first group III-nitride semiconductor comprises a sequence of alternating G-polar and N-polar GaN stripes.

3. The light source of claim 1, wherein the intrinsic polarization's modulation period is P; and
    wherein $|P-2L_{c,h}|<|P-2L_{c,h}^{bulk}|$, $L_{c,h}$ and $L_{c,h}^{bulk}$ being coherence lengths for second harmonic light generated by light of the preselected frequency in the waveguide and in a bulk sample of the first group III-nitride semiconductor, respectively.

4. The light source of claim 1, wherein twice the selected frequency is a frequency for ultraviolet light.

5. The light source of claim 1, further comprising:
    a second laser configured to emit light at another preselected frequency; and
    wherein the intrinsic polarization's modulation period is P; and
    wherein $|P-2L_c|<|P-2L_c^{bulk}|$, $L_c$ and $L_c^{bulk}$ being the coherence lengths for parametric light that is generated by light of the two preselected frequencies in the waveguide and in a bulk sample of the first group III-nitride semiconductor, respectively.

6. The light source of claim 2, wherein the sequence includes at least 1,000 of the stripes.

7. The light source of claim 2,
    wherein the striped layer of a second group III-nitride semiconductor is disposed between a crystalline substrate and the G-polar stripes.

8. The light source of claim 7, wherein the waveguide has an optical core layer and the striped layer of the second group III-nitride is five or more times thicker than the optical core layer.

9. An apparatus, comprising:
    an optical waveguide; and
    an optical filter positioned to receive light from the optical waveguide and configured to filter out light of a preselected frequency; and
    wherein the optical waveguide comprises a striped layer and a layer formed of a sequence of alternating first and second stripes, the stripes comprising a first group III-nitride semiconductor, the striped layer comprising a second group III-nitride semiconductor and being next to the other layer, the sequence running along a propagation direction in the optical waveguide, the first and second stripes comprising the first group III-nitride semiconductor in opposite polarization states.

10. The apparatus of claim 9, wherein the first and second stripes are respectively G-polar GaN and N-polar GaN.

11. The apparatus of claim 9, wherein the first and second stripes have the same width.

12. The apparatus of claim 9, wherein the sequence includes at least 1,000 of the stripes.

13. The apparatus of claim 9,
    wherein the striped layer comprises the second group III-nitride semiconductor is disposed between a crystalline substrate and the first stripes.

14. The apparatus of claim 13, wherein the waveguide has an optical core layer and the layer comprising the second group III-nitride is five or more times thicker than the optical core layer.

15. The apparatus of claim 9, further comprising a laser configured to transmit light of the preselected frequency to the waveguide.

16. The apparatus of claim 15, wherein the sequence of first and second stripes produces a polarization modulation with period P; and
    wherein $|P-2L_{c,h}|<|P-2L_{c,h}^{bulk}|$, $L_{c,h}$ and $L_{c,h}^{bulk}$ being coherence lengths for second harmonic light that is generated by light of the preselected frequency in the stripes and in a bulk sample of the first group-III nitride semiconductor semiconductor, respectively.

17. A method of fabricating a nonlinear optical source, comprising:

providing an optical second harmonic generator having an optical waveguide with a nonlinear optical medium whose intrinsic polarization has a periodic modulation, the waveguide comprising a layer of a first group III-nitride semiconductor and a striped layer of a second group III-nitride semiconductor next to the layer of the first group III-nitride semiconductor; and coupling a laser that transmits light of a preselected frequency to the waveguide, the preselected frequency capable of generating second harmonic light with a bulk coherence length in a homogenous bulk sample of the nonlinear optical medium, the period of the intrinsic polarization modulation being different from an even integer times the bulk coherence length.

18. The method of claim 17, further comprising coupling a filter that attenuates the preselected frequency to an output of the waveguide.

19. The method of claim 17, wherein the medium is gallium nitride.

* * * * *